United States Patent Office 3,247,278
Patented Apr. 19, 1966

3,247,278
CATALYTIC REACTIONS OF SULFUR WITH ORGANIC COMPOUNDS
William E. Garwood, Haddonfield, Lyle A. Hamilton, Pitman, George T. Kerr, Cherry Hill, and Claude G. Myers, Pitman, N.J., assignors to Socony Mobil Oil Company, Inc., a corporation of New York
No Drawing. Filed Mar. 21, 1963, Ser. No. 266,815
19 Claims. (Cl. 260—683.3)

This invention relates to the catalytic reaction of sulfur with organic compounds and, more particularly, to the reaction of organic compounds with sulfur by means of catalytic zeolites.

Zeolitic materials, both natural and synthetic, in naturally occurring and modified forms, have been demonstrated to have catalytic capabilities for conversion of organic materials. Such zeolitic materials are ordered crystalline aluminosilicates having a definite crystalline structure within which there are passages, pores or cavities of definite ranges of size. Since the dimensions of these pores are such as to accept for adsorption molecules of certain dimensions while rejecting those of larger dimensions, these materials have become to be known as "molecular sieves" and are utilized in a variety of ways to take advantage of these properties.

The present invention involves the use of such zeolitic materials for the purpose of catalyzing the reaction between organic compounds and sulfur. More specifically, it has been found that such zeolites form excellent materials for catalyzing the reaction between sulfur and organic compounds under desirable reaction conditions and for catalyzing other reactions related to said reaction.

It is accordingly a primary object of the present invention to provide a novel process for the catalytic reaction of sulfur with organic compounds involving the use of crystalline aluminosilicates as catalytic materials.

It is another principal object of the present invention to provide a novel process for the dehydrogenation or sulfurization of organic materials comprising contacting such materials, under reaction conditions, with molecular sieve crystalline aluminosilicates in the presence of sulfur.

It is still another important object of the present invention to provide a novel process for the sulfurization or dehydrogenation of organic compounds, and particularly hydrocarbons, involving the use of crystalline aluminosilicates in their alkali, alkaline earth metal or rare earth exchanged forms.

It is another principal object of the present invention to provide a novel process for the sulfurization or dehydrogenation of hydrocarbons, and particularly aromatic and aliphatic hydrocarbons, involving the use of crystalline aluminosilicate molecular sieve catalysts having substantially uniform interstitial dimensions of at least about 5A. in cross-section, said dehydrogenation taking place under reaction conditions in the presence of sulfur.

It is a further principal object of the present invention to provide a novel method of altering the chemical nature of a feed charge of organic material to be dehydrogenated or sulfurized and subsequently dehydrogenating or sulfurizing said altered feed charge comprising carrying out said altering and dehydrogenation or sulfurization reactions in the presence of a combined catalyst which includes an acid Y or acid mordenite crystalline aluminosilicate catalyst, said dehydrogenation or sulfurization taking place in the presence of sulfur.

It is a further object of the present invention to provide a novel process for the sulfurization or dehydrogenation of organic compounds involving the use of crystalline aluminosilicates having a zeolitic structure of rigid three-dimensional network, uniform pore size and well defined intra-crystalline dimensions such that only reactant or product molecules of suitable size and shape may be transported in either direction between the exterior phase and the interior of the crystalline zeolite, said dehydrogenation taking place in the presence of sulfur.

These and other objects and advantages of the present invention will become more apparent as the description proceeds in accordance with the ensuing specification and appended claims.

As previously indicated, the present invention involves the use of crystalline aluminosilicate zeolite molecular sieves to catalyze the reaction between sulfur and organic compounds. More specifically, however, the present invention may be broken down into two separate categories. In the first category, the catalytic materials of the present invention are used specifically to induce an interaction between sulfur and the organic material, the reaction product from such reaction being either a dehydrogenated, sulfur-free product or a sulfur-containing product, depending upon the reaction conditions employed. This category of reaction is involved when the organic starting material is sufficiently reactive to take part in the reaction with sulfur under reasonably moderate reaction conditions. In the second category, the organic starting materials are usually of high molecular weight or are refractory in nature and must first be broken down into lower molecular weight materials so that they will be more reactive with the sulfur in the presence of the catalyst and under moderate reaction conditions.

In the first category described above, that involving a reaction between sulfur and the organic charge material, dehydrogenation can readily be made the dominant reaction provided the organic material is in excess (as compared to the quantity of sulfur) at the reaction site. Unless this relationship is maintained, the sulfur will further react with the primary dehydrogenation products and sulfur-containing reaction products may result.

As a result of the above, the particular method of reacting the sulfur with the organic charge material is quite important. For example, in a first method of introducing sulfur into the reaction system, that illustrated in Example 4, the aluminosilicate catalyst is "preloaded" with sulfur, such as by heating the catalyst and sulfur together in an autoclave until the sulfur "fills" the pores of the catalyst. Using this method, few primary dehydrogenation products will be obtained since the sulfur will almost invariably be present in excess as compared to the organic charge material, and either secondary reaction products (as in Example 4) or sulfur-containing reaction products will more likely be produced. This "preloading" of the catalyst with sulfur, incidentally, may also be carried out in another way by loading the pores of the catalyst with $H_2S$ and oxidizing the $H_2S$ in place with oxygen to form elemental sulfur in the catalyst pores.

In another method, such as is illustrated in Examples 1 and 5, the vapors of sulfur and the organic material are passed simultaneously over the molecular sieve in the reaction zone. This may be accomplished, for example, by positioning a layer of sulfur upstream of a catalyst bed and passing the organic material in vapor form through the sulfur layer at a temperature sufficient to carry away sulfur vapor, the resultant vaporous mixture of organic material and sulfur then passing over the catalyst under reaction conditions. Using this technique, it is more feasible to obtain a reaction mixture in which the organic material is present in excess and to obtain the primary dehydrogenation products as the principal reaction product. A similar result may be obtained by premixing the organic feed material with $H_2S$ and a small amount of air prior to the passage of the organic feed material in contact with the molecular sieve catalyst, thus forming in situ during the dehydrogenation reaction the sulfur necessary for such reaction. This latter procedure is made possible due to the fact that the molecular sieves of the present invention catalyze the reaction $$H_2S + \tfrac{1}{2}O_2 \rightarrow S + H_2O$$

as is pointed out more particularly in Patent 2,971,824, whose disclosure is hereby incorporated by reference.

Quite obviously, depending upon whether the desired mechanism is dehydrogenation or sulfurization (or secondary reactions), one or the other of the above techniques will be utilized.

The aluminosilicates useable in accordance with the present invention include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$ is equal to unity. One cation may be exchanged either in entirety or partially by another cation utilizing exchange techniques as discussed hereinbelow. By means of such cation exchange, it is possible to vary the size of the pores in the given aluminosilicate by suitable selection of the particular cation. The spaces between the tetrahedra are occupied by molecules of water prior to dehydration.

A complete description of zeolites of the type useable in the present invention is found in Patent 2,971,824. These aluminosilicates have well-defined intracrystalline dimensions such that only reactant or product molecules of suitable size and shape may be transported in either direction between the exterior phase and the interior of the crystalline zeolite.

In their hydrated form, the aluminosilicates may be represented by the formula:

$$M_{2/n}O:Al_2O_3:wSiO_2:yH_2O \qquad (I)$$

wherein M is a cation which balances the electrovalence of the tetrahedra, $n$ represents the valence of the cation, $w$ the moles of $SiO_2$, and $y$ the moles of $H_2O$, the removal of which produces the characteristic open network system. The cation may be any one or more of a number of positive ions as aforesaid, such ions being discussed in greater detail hereinafter. The parent zeolite is dehydrated to actuate it for use as a catalyst. Although the proportions of inorganic oxides in the silicates and their spatial arrangement may vary, effecting distinct properties in the aluminosilicates, the main characteristic of these materials is their ability to undergo dehydration without substantially affecting the $SiO_4$ and $AlO_4$ framework. In this respect, this characteristic is essential for obtaining catalyst compositions of high activity in accordance with the invention.

Representative materials include synthesized crystalline aluminosilicates, designated zeolite X, which can be represented in terms of mole ratios of oxides as follows:

$$1.0 \pm 0.2 M_{2/n}O:Al_2O_3:2.5 \pm 0.5 SiO_2:yH_2O \qquad (II)$$

wherein M is a metal cation having a valence of not more than three, $n$ represents the valence of M, and $y$ is a value up to eight depending on the identity of M and degree of hydration of the crystal. The sodium form may be represented in terms of mole ratios of oxides as follows:

$$0.9Na_2O:Al_2O_3:2.5SiO_2:6.1H_2O \qquad (III)$$

Another synthesized crystalline aluminosilicate, designated zeolite A, can be represented in mole ratios of oxides as:

$$1.0 \pm 0.2 M_{2/n}O:Al_2O_3:1.85 \pm 0.5 SiO_2:yH_2O \qquad (IV)$$

wherein M represents a metal cation, $n$ is the valence of M, and $y$ is any value up to about 6. As usually prepared, zeolite A contains primarily sodium cations and is designated sodium zeolite A.

Other suitable synthesized crystalline aluminosilicates are those designed zeolite Y, L and D.

The formula for zeolite Y expressed in oxide mole ratios is:

$$0.9 \pm 0.2 Na_2O:Al_2O_3:wSiO_2:yH_2O \qquad (V)$$

wherein $w$ is a value ranging from 3 to 6 and $y$ may be any value up to about 9.

The composition of zeolite L in oxide mole ratios may be represented as:

$$1.0 \pm 0.1 M_{2/n}O:Al_2O_3:6.4 \pm 0.5 SiO_2:yH_2O \qquad (VI)$$

wherein M designates a metal cation, $n$ represents the valence of M, and $y$ is any value from 0 to 7.

The formula for zeolite D, in terms of oxide mole ratios, may be represented as:

$$0.9 \pm 0.2[xNa_2O:(1-x)K_2O]:Al_2O_3:wSiO_2:yH_2O \qquad (VII)$$

wherein $x$ is a value of 0 to 1, $w$ is from 4.5 to about 4.9 and $y$, in the fully hydrated form, is about 7.

Other synthetic crystalline aluminosilicates which can be used include those designated as zeolite R, S, T, Z, E, F, Q and B.

The formula for zeolite R in terms of oxide mole ratios may be written as follows:

$$0.9 \pm 0.2 Na_2O:Al_2O_3:wSiO_2:yH_2O \qquad (VIII)$$

wherein $w$ is from 2.45 to 3.65, and $y$, in the hydrated form, is about 7.

The formula for zeolite S in terms of oxide mole ratios may be written as:

$$0.9 \pm 0.2 Na_2O:Al_2O_3:wSiO_2:yH_2O \qquad (IX)$$

wherein $w$ is from 4.6 to 5.9 and $y$, in the hydrated form, is about 6 to 7.

The formula for zeolite T in terms of oxide mole ratios may be written as:

$$1.1 \pm 0.4 xNa_2O:(1-x)K_2O:Al_2O_3:6.9 \pm 0.5 SiO_2:yH_2O \qquad (X)$$

wherein $x$ is any value from about 0.1 to about 0.8 and $y$ is any value from about 0 to about 8.

The formula for zeolite Z in terms of oxide mole ratios may be written as:

$$K_2O:Al_2O_3:2SiO_2:yH_2O \qquad (XI)$$

wherein $y$ is any value not exceeding 3.

The formula for zeolite E in terms of oxide mole ratios may be written as:

$$0.9 \pm 0.1 M_{2/n}O:Al_2O_3:1.95 \pm 0.1 SiO_2:yH_2O \qquad (XII)$$

wherein M is a metal cation, $n$ is the valence of the cation, and $y$ is a value of 0 to 4.

The formula for zeolite F in terms of oxide mole ratios may be written as:

$$0.95 \pm 0.15 M_{2/n}O:Al_2O_3:2.05 \pm 0.3 SiO_2:yH_2O \qquad (XIII)$$

wherein M is a metal cation, $n$ is the valence of the cation, and $y$ is any value from 0 to about 3.

The formula for zeolite Q, expressed in terms of oxide mole ratios, may be written as:

$$0.95 \pm 0.05 M_{2/n}O:Al_2O_3:2.2 \pm 0.05 SiO_2:yH_2O \qquad (XIV)$$

wherein M is a metal cation, $n$ is the valence of the cation, and $y$ is any value from 0 to 5.

The formula for zeolite B may be written in terms of oxide mole ratios as:

$$1.0 \pm 0.2 M_{2/n}O:Al_2O_3:3.5 \pm 1.5 SiO_2:yH_2O \qquad (XV)$$

wherein M represents a metal cation, $n$ is the valence of the cation, and $y$ has an average value of 5.1 but may range from 0 to 6.

Other synthesized crystalline aluminosilicates include those designated as ZK-4 and ZK-5.

ZK-4 can be represented in terms of mole ratios of oxides as:

0.1 to 0.3R:0.7 to $1.0M_{2/n}O:Al_2O_3:2.5$ to $4.0SiO_2:yH_2O$ (XVI)

wherein R is a member selected from the group consisting of methyl ammonium oxide, hydrogen oxide and mixtures thereof with one another, M is a metal cation, $n$ is the valence of the cation, and $y$ is any value from about 3.5 to about 5.5. As usually synthesized, zeolite ZK-4 contains primarily sodium cations and can be represented by unit cell formula:

$$7.5 \pm 2Na:2 \pm 0.5H:9 \pm 2AlO_2:15 \pm 2SiO_2 \quad (XVII)$$

The major lines of the X-ray diffraction pattern of ZK-4 are set forth in Table 1 below:

TABLE 1

| $d$ Value of reflection in A.: | 100 $I/I_o$ |
|---|---|
| 12.00 | 100 |
| 9.12 | 29 |
| 8.578 | 73 |
| 7.035 | 52 |
| 6.358 | 15 |
| 5.426 | 23 |
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK-4 can be prepared by preparing an aqueous solution of oxides containing $Na_2O$, $Al_2O_3$, $SiO_2$, $H_2O$ and tetramethyl-ammonium ion having a composition, in terms of oxide mole ratios, which falls within the following ranges:

$SiO_2/Al_2O_3$ -------- 2.5 to 11

$\dfrac{Na_2O}{Na_2O + [(CH_3)_4N]_2O}$ -------- 0.5 to 2.5

$\dfrac{H_2O}{Na_2O + [(CH_3)_4N]_2O}$ -------- 25 to 50

$\dfrac{Na_2O + [(CH_3)_4N]_2O}{SiO_2}$ -------- 1 to 2 maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

ZK-5 is representative of another crystalline aluminosilicate which is prepared in the same manner as zeolite ZK-4 except that N,N'-dimethyltriethylenediammonium hydroxide is used in place of tetramethylammonium hydroxide. ZK-5 may be prepared from an aqueous sodium aluminosilicate mixture having the following composition expressed in terms of oxide mole ratios as:

$SiO_2/Al_2O_3$ -------- 2.5 to 11

$\dfrac{Na_2O}{Na_2O + [(CH_2)_6N_2(CH_3)_2]OH}$ -------- 0.5 to 2.5

$\dfrac{H_2O}{Na_2O + [(CH_2)_6N_2(CH_3)_2]OH}$ -------- 25 to 50

$\dfrac{Na_2O + [(CH_2)_6N_2(CH_3)_2]OH}{SiO_2}$ -------- 1 to 2

The N,N'-dimethyltriethylenediammonium hydroxide used in preparing ZK-5 can be prepared by methylating 1,4-diazabicyclo-(2.2.2)-octane with methyl iodide or dimethyl sulfate, followed by conversion to the hydroxide by treatment with silver oxide or barium hydroxide. The reaction may be illustrated as follows:

(XVIII)

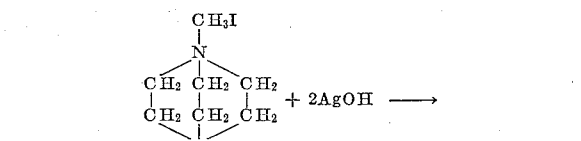

(XIX)

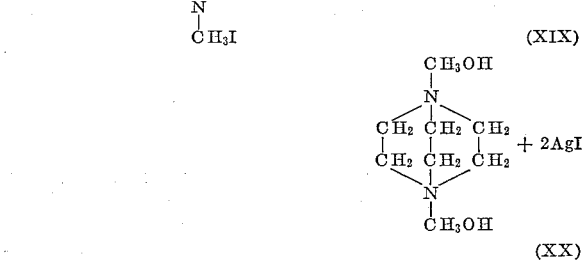

(XX)

In using the N,N'-dimethyltriethylenediammonium hydroxide compound in the preparation of ZK-5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methyl ammonium ion is converted to hydrogen ion.

Quite obviously, the above-listed molecular sieves are only representative of the synthetic crystalline aluminosilicate zeolite molecular sieve catalysts which may be used in the process of the present invention, the particular enumeration of such sieves not being intended to be exclusive.

At the present time, two commercially available molecular sieves are those of the "A" series and of the "X" series. A synthetic zeolite known as "Molecular Sieve 4A" is a crystalline sodium aluminosilicate having an effective pore diameter of about 4 Angstroms. In the hydrated form, this material is chemically characterized by the formula:

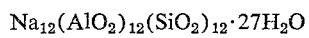

The synthetic zeolite known as "Molecular Sieve 5A" is a crystalline aluminosilicate salt having an effective pore diameter of about 5 Angstroms and in which substantially all of the 12 ions of sodium in the immediately above formula are replaced by calcium, it being understood that calcium replaces sodium in the ratio of one calcium ion for two sodium ions. A crystalline sodium aluminosilicate is also available commercially under the name of "Molecular Sieve 13X." The letter "X" is used to distinguish the inter-atomic structure of this zeolite from that of the "A" crystal mentioned above. As initially prepared and before activation by dehydration, the 13X material contains water and has the unit cell formula $$Na_{86}[(AlO_2)_{86}(SiO_2)_{106}] \cdot 267H_2O$$

The synthetic zeolite known as "Molecular Sieve 10X" is a crystalline aluminosilicate salt in which a substantial proportion of the sodium ions of the 13X material have been replaced by calcium.

Among the naturally occurring crystalline aluminosilicates which can be employed for purposes of the invention, the preferred aluminosilicates are those which sorb hydrocarbons above $C_3$. Exemplary of such aluminosilicates are faujasite, heulandite, clinoptilolite, dachiardite and aluminosilicates represented as follows:

Chabazite—$Na_2O \cdot Al_2O_3 \cdot 4SiO_2 \cdot 6H_2O$
Gmelinite—$Na_2O \cdot Al_2O_3 \cdot 4SiO_2 \cdot 6H_2O$
Mordenite—$Na_2O \cdot Al_2O_3 \cdot 10SiO_2 \cdot 6.6H_2O$ Other aluminosilicates which can be used are those resulting from caustic treatment of various clays.

Of the clay materials, montmorillonite and kaolin families are representative types which include the sub-bentonites, such as bentonite, and the kaolins commonly identified as Dixie, McNamee, Georgia and Florida clays in which the main mineral constituent is halloysite, kaolinite, dickite, nacrite or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be affected by reacting mixtures falling within the following weight ratios:

$Na_2O$/clay (dry basis) _____ 1.0–6.6 to 1
$SiO_2$/clay (dry basis) _____ 0.01–3.7 to 1
$H_2O/Na_2O$ (mole ratio) _____ 35–180 to 1

Molecular sieves are ordinarily prepared initially in the sodium form of the crystal. The sodium ions in such form may, as desired, be exchanged for other cations, as will be described in greater detail below. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibrium with the zeolite has a pH in the range of 9 to 12. After activating by heating until dehydration is attained, the substance is ready for use.

For example, in the preparation of sodium zeolite "A," suitable reagents for the source of silica include silica sol, silica gel, silicic acid or sodium silicate. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges: $SiO_2/Al_2O_3$ of 0.5 to 2.5, $Na_2O/SiO_2$ of 0.8 to 3.0 and $H_2O/Na_2O$ of 35 to 200. A convenient and generally employed process of preparation involves preparing an aqueous solution of sodium aluminate and sodium hydroxide and then adding with stirring an aqueous solution of sodium silicate.

The reaction mixture is placed in a suitable vessel which is closed to the atmosphere in order to avoid losses of water and the reagents are then heated for an appropriate length of time. Adequate time must be used to allow for recrystallization of the first amorphous precipitate that forms. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with salt-free water, while on the filter, until the wash water, in equilibrium with the zeolite, reaches a pH of 9 to 12. The crystals are then dried at a temperature between 25° C. and 150° C. Activation is attained upon dehydration, as for example at 350° C. and 1 mm. pressure or at 350° C. in a stream of dry air.

It is to be noted that the material first formed on mixing the reactants is an amorphous precipitate which is, generally speaking, not catalytically active in the process of the invention. It is only after transformation of the amorphous precipitate to crystalline form that the highly active catalyst described herein is obtained.

Molecular sieves of the other series may be prepared in a similar manner, the composition of the reaction mixture being varied to obtain the desired ratios of ingredients for the particular sieve in question.

In preparing the non-sodium forms of the catalyst composition, the aluminosilicate can be contacted with a non-aqueous or aqueous fluid medium comprising a gas, polar solvent or water solution containing the desired positive ion. Where the aluminosilicate is to contain metal cations, the metal cations may be introduced by means of a salt soluble in the fluid medium. When the aluminosilicate is to contain hydrogen ions, such hydrogen ions may be introduced by means of a hydrogen ion-containing fluid medium or a fluid medium containing ammonium ions capable of conversion to hydrogen ions.

Water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and metallic salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

The hydrogen ion, metal cation or ammonium ion may be present in the fluid medium in an amount varying within wide limits dependent upon the pH value of the fluid medium. Where the aluminosilicate material has a molar ratio of silica to alumina greater than about 5.0, the fluid medium may contain a hydrogen ion, metal cation or ammonium ion equivalent to a pH value ranging from less than 1.0 up to a pH value of about 10.0. Within these limits, pH values for fluid media containing a metallic cation or an ammonium ion range from 4.0 to 10.0, and are preferably between a pH value of 4.5 to 8.5. For fluid media containing a hydrogen ion alone, the pH values range from less than 1.0 up to about 7.0 and are preferably within the range of less than 3.0 up to 6.0. Where the molar ratio of the aluminosilicate is greater than about 2.2 and less than about 5.0, the pH value for the fluid media containing a hydrogen ion or a metal cation ranges from 3.8 to 8.5. Where ammonium ions are employed, the pH value ranges from 4.5 to 9.5 and is preferably within the limit of 4.5 to 8.5. When the aluminosilicate material has a molar ratio of silica to alumina less than about 3.0, the preferred medium is a fluid medium containing an ammonium ion instead of a hydrogen ion. Thus, depending upon the silica to alumina ratio, the pH value varies within rather wide limits.

In carrying out the treatment with the fluid medium, the procedure employed comprises contacting the aluminosilicate with the desired fluid medium or media until such time as metallic cations originally present in the aluminosilicate are removed to the desired extent. Repeated use of fresh solutions of the entering ion is of value to secure more complete exchange. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment, as well as determination of and correction for anions that pass in to the effluent wash from soluble substances or decomposition products of insoluble substances which are otherwise present in the aluminosilicate as impurities. The aluminosilicate is then dried and dehydrated.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NHS_3H$), amidodisulfonic acid $$(NH(SO_3H)_2)$$

chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$), hydroxylamine disulfonic acid [$(HSO_3)_2NOH$], nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkylsuccinic acid, alkenylsuccinic acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid, 1,4-cyclohexanedicarboxylic acid, 2 - carboxy - 2 - methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxy-cinnamic acid, hydrocinnamic acid, pyrogallic acid, benzoic acid, ortho, meta and para-methyl, hydroxy, chloro, bromo and nitro-substituted benzoic acids, phenylacetic acid, mandelic acid, benzylic acid, hippuric acid, benzenesulfonic acid, toluenesulfonic acid, methanesulfonic acid and the like.

Other sources of hydrogen ions include carboxy polyesters prepared by the reaction of an excess of polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartrate and the like. Still other ammonium compounds which can be employed include tetraalkyl and tetraaryl ammonium salts such as tetramethylammonium hydroxide, trimethylammonium hydroxide. Other compounds which can be employed are nitrogen bases such as the salts of guanidine, pyridine, quinoline, etc.

A wide variety of metallic compounds can be employed with facility as a source of metallic cations and include both inorganic and organic salts of the metals of Group IA through Group VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitation on the particular metal salt or salts employed is that it be soluble in the fluid medium in which it is used.

Rare earth salts may be advantageously employed. Such rare earth salts can either be the salt of a single metal or, preferably, of mixtures of metals such as a rare earth chloride or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. The rare earth chloride solution is commercially available and it contains the chlorides of a rare earth mixture having the relative composition: cerium (as $CeO_2$) 48% by weight; lanthanum (as $La_2O_3$) 24% by weight; praseodymium (as $Pr_6O_{11}$) 5% by weight; neodymium (as $Nd_2O_3$) 17% by weight; samarium (as $Sm_2O_3$) 3% by weight; gadolinium (as $Gd_2O_3$) 2% by weight; yttrium (as $Y_2O_3$) 0.2% by weight; and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths, 1–2% by weight. It is to be understood that other mixtures of rare earths are equally applicable in the instant invention.

Representative metal salts which can be employed, aside from the mixture mentioned above, include silver chloride, silver sulfate, silver nitrate, silver acetate, silver arsinate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, magnesium chloride, magnesium bromide, magnesium sulfate, magnesium sulfide, magnesium acetate, magnesium formate, magnesium stearate, magnesium tartrate, manganese chloride, manganese sulfate, manganese acetate, manganese carbonate, manganese formate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, lanthanum bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, selenium chloride, selenium bromide, tellurium chloride, tellurium bromide, etc.

The aluminosilicate catalysts useable in connection with the process of the present invention may be used in powdered, granular or molded state formed into spheres or pellets of finely divided particles having a particle size of 2 to 500 mesh. In cases where the catalyst is molded, such as by extrusion, the aluminosilicate may be extruded before drying, or dried or partially dried and then extruded. The catalyst product is then preferably precalcined in an inert atmosphere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

The aluminosilicate catalysts prepared in the foregoing manner may be used as catalysts per se or as intermediates in the preparation of further modified contact masses consisting of inert and/or catalytically active materials which otherwise serve as a base, support, carrier, binder, matrix or promoter for the aluminosilicate. One embodiment of the invention is the use of the finely divided aluminosilicate catalyst particles in a siliceous gel matrix wherein the catalyst is present in such proportions that the resulting product contains about 2 to 95% by weight, preferably about 5 to 50% by weight, of the aluminosilicate in the final composite.

The aluminosilicate-siliceous gel compositions can be prepared by several methods wherein the aluminosilicate is combined with silica while the latter is in a hydrous state such as in the form of a hydrosol, hydrogel, wet gelatinous precipitate or a mixture thereof. Thus, silica gel formed by hydrolyzing a basic solution of alkali metal silicate with an acid such as hydrochloric, sulfuric, etc., can be mixed directly with finely divided aluminosilicate having a particle size less than 40 microns, preferably within the range of 2 to 7 microns. The mixing of the two components can be accomplished in any desired manner, such as in a ball mill or other types of kneading mills. Similarly, the aluminosilicate may be dispersed in a hydrogel obtained by reacting an alkali metal silicate with an acid or an alkaline coagulent. The hydrosol is then permitted to set in mass to a hydrogel which is thereafter dried and broken into pieces of desired shape, or dispersed through a nozzle into a bath of oil or other water-immiscible suspending medium to obtain spheroidally shaped "bead" particles of catalyst. The aluminosilicate siliceous gel thus obtained is washed free of soluble salts and thereafter dried and/or calcined as desired.

The siliceous gel matrix may also consist of a plural gel comprising a predominant amount of silica with one or more metals or oxides thereof. The preparation of plural gels is well known and generally involves either separate precipitation or coprecipitation techniques in which a suitable salt of the metal oxide is added to an alkali metal silicate and an acid or base, as required, is added to precipitate the corresponding oxides. The silica content of the siliceous gel matrix contemplated herein is generally with the range of 55 to 100 weight percent with the metal oxide content ranging from 0 to 45 percent. Minor amounts of promoters or other materials which may be present in the composition include cerium, chromium, cobalt, tungsten, uranium, platinum, lead, zinc, calcium, magnesium, lithium, silver, nickel and their compounds.

The aluminosilicate catalyst may also be incorporated in an alumina gel matrix conventionally prepared by adding ammonium hydroxide, ammonium carbonate, etc., to a salt of aluminum, such as aluminum chloride, aluminum sulfate, aluminum nitrate, etc., in an amount to form aluminum hydroxide, which, upon drying, is converted to alumina. The aluminosilicate catalyst can be mixed with the dried alumina or combined while the alumina is in the form of a hydrosol, hydrogel or wet gelatinous precipitate.

While the molecular sieves described hereinabove are generally useable to catalyze the process of the present invention, certain of the molecular sieves are preferred over the others. Where the essential function of the molecular sieve is to induce an interaction between the sulfur and the organic material (viz., category 1 previously mentioned), the metal cation-containing molecular sieves are preferred. Of these, the more desirable cations are those forming complexes (i.e., polysulfides) with sulfur. The most effective metal cations in this category are the alkali metals, alkaline earth metals and the rare earths.

A desirable embodiment of the present invention involves the use of a cyclic process which comprises separating the by-product $H_2S$ from the desired reaction products and oxidizing the $H_2S$ back to sulfur with air over a second bed of catalyst in the manner taught in U.S. Patent 2,971,824. For example, in the dehydrogenation of propane by means of the instant process, the product stream ($H_2S$, propane, propene, benzene, having respective boiling points of $-79°$ F., $-44°$ F., $-54°$ F., and $+176°$ F.) could be separated by fractionation, the $H_2S$ regenerated back to sulfur by oxidation with air over a second bed of sieve, and both the sulfur and propane recycled back over the first bed of catalyst.

This cyclic process can be carried out most effectively by the use of molecular sieve catalysts of the alkali metal, ammonium, silver, calcium, strontium, zinc, nickel, cobalt, magnesium and rare earth forms, with catalysts such as the sodium X, lithium X, cobalt X, calcium X, calcium A and the rare earth X and rare earth Y forms being particularly preferred for this purpose, since these catalysts in particular have extremely effective activity both for the oxidation and the reduction reactions. In a practical cyclic operation (dehydrogenation with sulfur and the molecular sieve in a top bed, adsorption of $H_2S$ in a bottom bed, regeneration of the bottom bed, then reversal of flow), therefore, these aluminosilicates can be most advantageously utilized.

In the second category previously discussed, wherein the essential function of the molecular sieve catalyst is to induce conversion of the charged organic material before the reaction with sulfur takes place so as to form more reactive organic materials, a molecular sieve having cracking activity should preferably be used in conjunction with the metal cation-containing sieves described above.

The preferred molecular sieves useable for the cracking function are those having a minimum catalytic activity constant, as measured by the following test:

The catalyst to be evaluated for cracking activity is placed in a reactor into which n-hexane is fed. The flow rate of the n-hexane, catalyst sample size and temperature in the reactor are preselected to obtain conversion levels in the range of 5 to 50 weight percent. The hexane is fed to the reactor until the catalyst to oil ratio (volume basis) equals about 4. At this time a sample of the reaction products is taken and analyzed by gas chromatography.

The conversion of n-hexane determined from the chromatograph is converted to a reaction rate constant by the assumption of a first order or pseudo-first order reaction. Some trial and error may be necessary to select particular conditions. As a general guide, space velocity and temperature can be varied until a conversion is in the above range. If it should happen that the catalyst has a heavy coke deposit at low conversion severity should be decreased. The value obtained is normalized by dividing by the reaction rate constant for a conventional silica-alumina catalyst containing about 10 weight percent alumina and a CAT-A activity of 46 as described in National Petroleum News 36, page P.R.–537 (August 2, 1944). Such catalyst is hereinafter designated as 46AI silica-alumina catalyst. This value is then corrected to 1000° F. by the use of an Arrhenius plot if the evaluation occurred at some other temperature. Results are therefore reported as relative reaction rate constants at 1000° F.

The range of operating conditions for this test are as follows:

Temperature in reactor, ° F. _____ 700 to 1000
Liquid hourly space velocity _____ 0.2 to 60
n-Hexane flow rate, cc./hr. _____ 2 to 30
Catalyst volume in reactor, cc. _____ 0.5 to 10

The test conditions are usually chosen so that time on stream is between 15 seconds and 30 minutes and preferably between 30 seconds and 15 minutes.

When used in this specification and/or claims, the term "cracking activity constant" will be understood to be the constant obtained for the catalyst in question in accordance with the above test.

In accordance with this invetnion the aluminosilicate catalysts utilized for the cracking function are prepared to have at least a specified minimum level of unique activity. Advantageously, it has been found that a catalyst having an activity constant above 10 and preferably above 50 as determined by the above described test will provide efficient cracking at temperautres below 700° F. and at hourly liquid space velocities on the order of 5 to 25. It is particularly preferred that the catalysts employed for the cracking function in the process of the present invention possess an activity constant greater than 1500.

Preferred catalysts in this second category are the acid Y, rare earth and acid mordenite catalysts. As an example of the latter, microcrystalline wax may be converted to sulfurized paraffin oil by reacting 100 gms. of the wax with 30 gms. of sulfur at 150° C. in the presence of a mixture of 25 gms. of hydrogen mordenite and 10 gms. of $13 \times$ sieve, the reaction continuing until $H_2S$ evolution ceases.

The present invention is most advantageously carried out with molecular sieves having pores or channels of at least about 5 Angstrom units, such molecular sieves being most effective in the reactions of the present invention.

As previously indicated, the process of the present invention is generally applicable to the reaction of any organic compound with sulfur since any such reaction will be catalyzed by the molecular sieves of the present invention. The process is, however, particularly applicable to the reaction with sulfur of hydrocarbons, aromatic and aliphatic substances being the most desirable organic starting materials.

Numerous examples may be given of particular applications of the process of the present invention. For example, paraffins (i.e., propane, methane, ethane, butane, n-decane, n-hexadecane, etc.) may be reacted with sulfur in the presence of the molecular sieves to form various reaction products. In the case of methane, both dehydrogenation and coupling may take place (as in Example 9) and a longer chain alkane be produced. In the case of paraffins such as the others mentioned above, the reaction products can be olefinic primary dehydration products or, if it is desired to use an excess of sulfur, various sulfur-containing or secondary reaction products may be obtained. Similarly, olefinic starting materials may be reacted in the presence of sulfur and a molecular sieve catalyst to form polyolefins. Examples in this category would be the conversion of butene to form butadiene or, if a sulfur-containing product was desired, the subsequent reaction of the butadiene with sulfur in the presence of a molecular sieve catalyst to form thiophene. Various other starting materials such as ketones or aromatics may also be employed effectively in the process of the present invention. For example, alkyl aromatics such as ethylbenzene and cumene may be dehydrogenated respectively in the presence of sulfur and a molecular sieve catalyst to styrene and β-methyl vinyl benzene. Alkyl naphthalenes may be similarly converted to their corresponding olefinic naphthalenes. Toluene may be dehydrogenated and induced to take part in what is essentially a coupling reaction in the presence of sulfur and a molecular sieve catalyst to form stilbene. On the other hand, benzene can be sulfurized with sulfur and water at a temperature of about 600–700° F. to form thiophenol and, at higher temperatures (i.e., 1100° F.), can be converted to form substantial quantities of cabron disulfide. Similarly, reactions such as are set forth in Patent 3,040,057, involving 1,2-dithiole-3-thiones, may also be carried out in the presence of the molecular sieves of the present invention, an excess of sulfur being used to result in the sulfurization of the basic reactant material. Ketones such as methylethyl ketone may be dehydrogenated in the presence of sulfur and a molecular sieve of the present invention to form unsaturated ketones such as methylvinyl ketone. Similarly, a dehydrogenation reaction may take place involving the conversion of cyclohexanone to phenol through the reaction with sulfur in the presence of a molecular sieve catalyst. Still other reactions will present themselves to those skilled in the art without departing from the framework of the present invention. In general, preferred organic starting materials should be of such a size that they will enter into the pores of a molecular sieve which are at least about 5 A., though it is possible to carry out the present invention notwithstanding the fact that the reactants do not enter the pores of the molecular sieve catalyst.

As previously indicated, depending upon whether the desired reaction is dehydrogenation or sulfurization, one or the other of the reactants will be used in excess. In general the ratio of moles of organic reactant to g.-atoms of sulfur will preferably be 20:1 to 0.1:1 and the space velocity of the gaseous organic material over the molecular sieve is preferably 10–1000 vol./vol. cat./hr. As has previously been indicated and as will be seen more particularly in the ensuing examples, the sulfur may be premixed with the organic material in vapor form, may be added intermittently in solid form to the top of the sieve bed concurrently with the organic material flow, may be formed in situ on the molecular sieve by premixing excess $H_2S$ and a small amount of air with the organic material prior to passage of the mixture in contact with the molecular sieve, or may be "preloaded" on to the sieve, so long as the overall ratio of organic material to sulfur charged remains approximately within the above limits.

The reaction conditions will, of course, vary depending upon the particular organic material to be treated. For example, propane is conveniently dehydrogenated at atmospheric pressure and temperatures of between about 550° F. to 1200° F., with temperatures of between about 650–850° F. being preferred. While the operating pressure need not be atmospheric in all instances, atmospheric is generally preferred and pressures of below 200 p.s.i.g. are desirable.

It is desirable to eliminate free hydrogen from the organic material feed stream since it would tend to compete with the organic materials for sulfur. Hydrogen may be conveniently separated from the feed gas stream by known methods, such as by diffusion through palladium films.

Following are specific examples illustrating the methods of carrying out the present invention. All of the processes described were conducted in a 21" long vycor (quartz) tube reactor having a 1 1/16" inside diameter, which tube was in turn inserted in a 13", 750 watt horizontal furnace. The catalyst beds were centered in the furnace and the catalyst temperature measured by a probing thermocouple (moved inside a concentric glass thermowell).

*Example 1.—Propane over sodium-zeolite X sieve*

Propane (Mathieson C.P. grade, 99.0% min. purity) was passed at the rate of 60 cc./min. (corrected to 760 mm., 60° F.) over a catalyst bed consisting of a layer of 0.5 g. sulfur (sublimed powder, J. T. Baker Chemical Co.) followed by 14.8 g. (23 cc.) of commercial Linde sodium-zeolite X sieve (1/16" x 1/8" pellets) at room temperature for 20 minutes. Heat was then applied to the catalyst bed, and the effluent gas passed through a 30 cc. gas collection bottle and then bubbled through 200 cc. of a colorless aqueous solution containing 12 g. $CdSO_4$. When the catalyst temperature reached 650° F. (in 18 minutes), the sulfur layer had virtually disappeared, the sieve pellets were yellow, and $H_2S$ was being formed as indicated by precipitation of yellow CdS in the $CdSO_4$-$H_2SO_4$-$H_2O$ solution. The catalyst temperature was raised to 790° F. in the next 8 minutes, and at that point the effluent gas stream switched to a second gas collection bottle and $CdSO_4$-$H_2SO_4$-$H_2O$ solution. The catalyst bed was held at a temperature of 800–813° F. for the next 25 minutes, switching to new gas collection bottles at 5 minute intervals and to a third $CdSO_4$-$H_2SO_4$-$H_2O$ solution after the first 5 minute period. Mass spectrometer analysis of the gas and sulfide analyses of the solution are as follows:

| Time, min | 8 | 13 | 18 | 23 | 28 | 33 |
|---|---|---|---|---|---|---|
| Temp., °F | 650–790 | 813 | 810 | 810 | 802 | 799 |
| $H_2S$, wt. percent of S charged (CdS analysis) | 64 | 17 | 12 | 12 | 12 | 12 |
| Composition of gas, wt. percent (Mass Spec.): | | | | | | |
| Propene | 1.2 | .4 | | | | |
| Benzene | 1.0 | 0.5 | 0.1 | | | |
| $H_2S$ | 33.4 | 6.4 | 3.5 | 1.8 | 1.0 | 0.7 |
| Propane | 63.6 | 91.6 | 95.5 | 97.4 | 98.1 | 98.3 |

Light paraffins including ethane and isobutane were observed in such small amounts that their presence is not established.

The catalyst was cooled to room temperature in a stream of nitrogen. The 14.2 g. were pale blue in color and contained 0.1 wt. percent carbon and 0.24 wt. percent sulfur. This sulfur amounts to 11 wt. percent of the total charged at the start of the run.

*Example 2.—Propane over sodium zeolite X sieve*

The procedure and temperature-time sequence were the same as those of Example 1, except that no sulfur was placed ahead of the 15.5 g. (25 cc.) of Linde sodium zeolite X sieve and, since there was no $H_2S$, the $CdSO_4$-$H_2SO_4$-$H_2O$ scrubber was eliminated. Mass spectrometer analysis indicated the product gas to be all propane.

*Example 3.—Propane over vycor (quartz) catalyst*

The same procedure was used as in Example 1, except that the 0.5 g. of sulfur was followed by 29.7 (25 cc.) of vycor chips, 14–25 mesh. Results were:

| Time, min | 10 | 35 |
|---|---|---|
| Temp., °F | 650–794 | 800 |
| $H_2S$, wt. percent of S charged (CdS analysis) | 2 | <1 |
| Composition of gas, wt. percent: | | |
| $H_2S$ | 1.4 | |
| Propane | 98.2 | 99.6 |

The 30.1 g. of catalyst out contained 0.1 wt. percent carbon and 0.08 wt. percent sulfur. Thus, most of the sulfur passed over the vycor chips without reacting with the propane (depositing on the cold walls of the reactor downstream from the catalyst bed).

*Example 4.—Propane over presulfided sodium-zeolite X sieve*

The catalyst was prepared by heating together at 850° F. for 2 hours 85 g. of Linde sodium zeolite X sieve and 35 g. of sulfur in a glasslined rocking autoclave. This was more than enough sulfur to "fill" the pores of the catalyst, because upon cooling to room temperature, 27 g. of a solid mass of sulfur and sodium zeolite X pellets were found at the bottom of the glass liner. The 92 g. of yellow pellets (not encased in the solid mass) contained by analysis 12.9 wt. percent sulfur.

One hundred cc. (72.5 g.) of this presulfided sodium zeolite X sieve was charged to the reactor, and propane passed through at the rate of 60 cc. per minute for 20 minutes. The propane flow was then shut off while the temperature was raised to 800° F. in 40 minutes (during this time a multi-colored yellow-red-violet solid material collected on the walls of the reactor downstream of the catalyst bed). The propane flow was then continued for 25 minutes with the catalyst bed at 780–813° F. The total gas off during the heating up period and 25 minutes of flow was collected over a saturated salt solution, and a portion of the approximately 2100 ml. collected (760 mm., 60° F.) was sent for mass spectrometer analysis with the following results:

Benzene, wt. percent _____ 1.3
$H_2S$, wt. percent _____ 34.8
Propane, wt. percent _____ 62.8
(Ethane and isobutane were reported in amounts too small to prove their presence.)

At the end of the 25 minutes at 800° F. the propane flow was again stopped, temperature raised to 850° F. and propane flow resumed for another 25 minutes. The approximately 1450 ml. of gas collected during this period analyzed as follows:

Benzene, wt. percent _____ 0.1
$H_2S$, wt. percent _____ 9.4
Propane, wt. percent _____ 90.0

The 68 g. of catalyst removed from the reactor upon cooling in a stream of nitrogen (about half the pellets yellow, other half pale blue) contained <0.05 wt. percent carbon and 2.78 wt. percent sulfur.

The solid material adhering to the walls of the downstream side of the reactor had a sulfur compound "stench" and was soluble in $CS_2$.

Benzene, but no propylene, was found in the product of this example, whereas both were found in Example 1. It is postulated that the greater quantity of sulfur and the lower propane rate combined to convert any intermediate propylene to benzene.

*Example 5.—Propane over acid rare-earth exchanged sodium zeolite X sieve*

The sieve used in this example was prepared as follows:

(1) Formation of sodium zeolite X sieve

SOLUTION "A"

|  | Lbs. |
|---|---|
| $H_2O$ | 38.6 |
| NaOH | 2.2 |
| "N" brand silicate containing 28.8% $SiO_2$, 9.0% $Na_2O$, 0.015% $Fe_2O_3$, remainder $H_2O$ | 15.2 |

SOLUTION "B"

|  | Lbs. |
|---|---|
| $H_2O$ | 39 |
| NaOH | 2.2 |
| $Na_3(AlO_3)$ | 5.1 |

(a) Solution "B" added to solution "A";
(b) Stirred 30 minutes at room temperature;
(c) Heat treated 20–24 hours at 200° F.;
(d) Supernatant liquid decanted;
(e) Slurry filtered; and
(f) Filter cake washed with a volume of water equal to the volume of the starting solutions "A" and "B."

(2) Exchange with rare earth chlorides —$NH_4Cl$
(a) Filter cake base exchanged continuously at 180° F. with 30 times its weight of 5% rare earth chlorides +2% $NH_4Cl$ in $H_2O$;
(b) Washed chloride free at 180° F.;
(c) Oven dried 20 hours at 230° F.;
(d) Calcined 10 hours at 1000° F.; and
(e) Analyzed—combined bare earth oxides=25.4 wt. percent; sodium=0.7 wt. percent.

Twenty-five cc. (15.1 g.) of this catalyst (>200 mesh) was placed behind 0.5 g. of sulfur in the reactor, and the procedure of Example 1 followed. The first appearance of $H_2S$ in the product gas stream was at 700° F. Summary of results:

| Time, min | 3 | 8 | 13 | 18 | 23 | 28 |
|---|---|---|---|---|---|---|
| Temp., °F | 700–730 | 735 | 731 | 727 | 727 | 725 |
| $H_2S$, wt. percent of S charged (CdS analysis) | 30 | 28 | 28 | 28 | 3 | 3 |
| Composition of gas, wt. percent (Mass Spec.): | | | | | | |
| Propene | [1]0.5 | 0.1 | 0.1 | | | |
| $H_2S$ | 26.0 | 26.3 | 3.4 | 1.2 | 0.7 | 0.6 |
| Propane | 71.8 | 72.6 | 95.2 | 97.9 | 98.5 | 98.0 |

[1] Presence of propene confirmed by gas chromatography. Small amounts of methane, ethane, n-butane and isobutane also present.

The 15.0 g. of catalyst out contained 0.36 wt. percent surfur and 0.9 wt. percent carbon, and was blue in color.

*Example 6.—Ethane over sulfur-sodium zeolite X sieve*

Equipment and procedures were the same as those used in Examples 1–5, except that the reactor and furnace were placed in a vertical position, Mathieson C. P. grade (min. 99% purity) ethane was passed in continuously at the top of the reactor, sulfur was added periodically through a side arm, and the exit gas was passed through a Dry Ice trap (−80° F.) and then to an $H_2O$-brine gas collection bottle.

(a) Eight g. (12.5 cc.) of Linde sodium zeolite X sieve were heated to 800° F. with ethane passing through at the rate of 110 cc./min. (corrected to 760 mm., 60° F.). The sulfur was then added above the catalyst bed in 0.4 g. portions at 15 min. intervals during the first 90 minutes, the total sulfur added being 2.8 g. (some adhering to the walls of the glass reactor tube above the catalyst bed). After a total of 105 minutes run time, both ethane and heat were turned off, and the catalyst cooled to room temperature in a stream of nitrogen.

The Dry Ice trap contained 1.1 cc. water-white liquid at −80° F., 1.0 cc. (1.1 g.) after warming to room temperature (7.5 wt. percent of ethane charge). Infra-red analysis of this liquid showed it to be predominantly carbon disulfide. Mass spectroscopy confirmed the carbon disulfide and also showed 4.4 mole percent benzene, 0.2% thiophene, and a trace of methyl thiophene to be present.

Summary:

Charge:
  Sulfur (excluding that unreacted above the catalyst bed and losses), g. _____ 18
  Ethane, g. _____ 14.6
Products:
  Total gas (combined light gas not condensed in trap at −80° F., and heavy gas from weathering trap to room temperature), g. __ 14.5
    Ethane, wt. percent _____ 93
    $H_2S$, wt. percent _____ 6
  Liquid product (residue after weathering, trap), g. _____ 1.1
    Carbon, wt. percent _____ 15.77
    Hydrogen, wt. percent _____ 0.29
    Sulfur, wt. percent _____ 81.2
  Used catalyst, g. _____ 8.3
    Carbon, wt. percent _____ 0.6
    Sulfur, wt. percent _____ 0.93

(b) Sixteen g. (25 cc.) Linde sodium zeolite X sieve, ethane flow rate of 55 cc./min. (total 8.3 g.), temperature 800° F., eight additions of 0.4 g. portions of sulfur at 15 minute intervals, and 120 min. run time were used in this example. A complete material balance was not made. Liquid product was again obtained, 1.2 g., same appearance and odor as that in the run of paragraph (a). Carbon content was 16.05 wt. percent, hydrogen 0.35 wt. percent (no other analysis made).

*Example 7.—Normal hexadecane over sulfur-sodium zeolite X sieve*

The catalyst for this run was made by heating together 170 g. Linde sodium zeolite X sieve, 1/16" pellets, and 8.6 g. flowers of sulfur in a glass-lined 1 liter bomb at 826–850° F. for 2 hours. The 178 g. of light violet colored final catalyst contained, by analysis, 4.39 wt. percent sulfur.

Normal hexadecane (Humphrey and Wilkinson, ASTM grade, 99% min. purity) was passed over 50 cc. (33.3 g.) of this catalyst in a stainless steel reactor at a rate of 25 cc./hr. (0.5 LHSV), temperature 870° F., nitrogen atmosphere and nitrogen flow rate of 13.4 l/hr., pressure 50 p.s.i.g., run time 6 hours. Fifty cc. (31.4 g.) of fresh sodium zeolite X pellets were placed in the reactor 9 inches downstream from the 50 cc. of the sulfur-loaded sieve, separated from it by a stainless steel spacer (the 9 inches without the spacer would hold 86 cc. of catalyst). No outside heat was applied to this $H_2S$ "collector" sieve, so that the temperature gradient ranged from that of the hot product at the top (870° F.) to a lower temperature at the bottom (265° F. measured by a thermocouple on the outside of the reactor).

A material balance was made during the 2–6 hour period. Liquid recovery was 95 vol. percent (of n-hexadecane charged), hydrogen content 14.90 wt. percent compared to 15.04 wt. percent for the charge, and sulfur content 0.08 wt. percent. Dehydrogenation to olefins is indicated by bromine No. (24.8) and FIA composition analysis (17 vol. percent olefins, 2 vol. percent aromatics).

A complete material balance was made, and the liquid product fractionated with results as follows (yields expressed as wt. percent of n-hexadecane charged):

| | |
|---|---|
| $H_2$ (in gas) | 0.8 |
| $C_1$–$C_3$ | [1] 3.2 |
| $C_4$ | [2] 2.6 |
| $C_5$ | [3] 1.1 |
| $C_6$–170° F. | 3.8 |
| 170–390° F. | 23.7 |
| 390° F.+ | 63.2 |
| Hydrocarbon adsorbed on sieve and loss | 1.6 |
| Total | 100.0 |

[1] 0.3% methane, 0.7% ethane, 0.3% ethylene, 1.0% propane, 0.9% propene.
[2] 0.3% isobutane, 1.5% butenes, 0.8% n-butane.
[3] 0.3% isopentane, 0.3% pentenes, 0.5% n-pentane.

Compositions of the $C_6$–170° F. and 170–390° F. fractions by mass spectroscopy were as follows:

| | $C_6$–170° F. Fraction | 170–390° F. Fraction |
|---|---|---|
| Paraffins, wt. percent | 18.9 | 58.2 |
| Monocyclic naphthenes | 80.2 | 3.4 |
| Mono-olefins | | 34.2 |
| Di-olefins and cyclo-olefins | | 1.8 |
| Monocyclic aromatics | 0.9 | 2.1 |
| Indanes and tetralins | | 0.1 |
| Naphthalenes | | 0.2 |

Dehydrogenation to olefins is thus confirmed by the 170–390° F. fraction analysis.

*Example 8.—Normal hexadecane over sodium zeolite X sieve (no sulfur)*

Procedures and conditions were the same as in the above run. Very little reaction of n-hexadecane occurred over the sodium zeolite X alone during the 2–6 hour material balance period judging from API gravity (50.8, same as charge), vol. percent recovery (101) hydrogen content (14.98 vs. 15.04 for charge), and FIA composition analysis (1 vol. percent aromatics, 4 vol. percent olefins).

*Example 9.—Methane over sulfur-sodium zeolite X sieve*

Mathieson technical grade methane [97.5 mole percent methane, 1.9 mole percent (3.4 wt. percent) ethane by mass spect. analysis] was charged at the rate of 55 cc./min. over 16 g. (25 cc.) Linde sodium zeolite X sieve, temp. 800° F., eight additions of 0.4 g. portions of sulfur at 15 minute intervals, 120 minute run time.

The trap at −80° F. contained 0.2 cc. liquid, which vaporized upon warming to room temperature and was found by mass spectroscopy to be primarily n-butane—total weight (including that found in light gas) 0.12 g. (2.7 wt. percent of methane charge).

Summary:

Charge:

| | |
|---|---|
| Sulfur (excluding that unreacted above catalyst bed and losses), g. | 3.0 |
| Methane, g. | 4.5 |

Products:

| | |
|---|---|
| Gas (combined), g. | 5.0 |
| Methane, wt. percent | 84 |
| $H_2S$, wt. percent | 10 |
| n-Butane (2.4 wt. percent ethane present), wt. percent | 2 |
| Used catalyst, g. | 18.4 |
| Carbon, wt. percent | <0.05 |
| Sulfur, wt. percent | 15.3 |
| Carbon, wt. percent | <0.05 |
| Sulfur, wt. percent | 15.3 |

The formation of the n-butane thus indicates that both dehydrogenation and coupling have taken place.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for the dehydrogenation of a hydrocarbon comprising reacting said hydrocarbon with sulfur under dehydrogenation conditions in the presence of a crystalline aluminosilicate zeolite molecular sieve catalyst, the quantity of sulfur relative to the quantity of hydrocarbon being stoichiometrically such as to result in dehydrogenation of the latter.

2. A process as defined in claim 1 wherein said molecular sieve catalyst contains a cation selected from alkali metals, alkaline earth metals and the rare earths, said cation serving to neutralize the negative charge associated with a tetrahedral aluminum atom in the crystal lattice of said aluminosilicate.

3. A process as defined in claim 1 wherein said hydrocarbon is a paraffin.

4. A process as defined in claim 1 wherein said crystalline aluminosilicate has pore openings of at least approximately 5 A. in cross-section.

5. A process as defined in claim 1 wherein said crystalline aluminosilicate contains a cation which is capable of forming a complex with sulfur, said cation serving to neutralize the negative charge associated with a tetrahedral aluminum atom in the crystal lattice of said aluminosilicate.

6. A process as defined in claim 5 wherein said complex is a polysulfide.

7. A process as defined in claim 1 wherein said molecular sieve is preloaded with sulfur prior to said reaction between the sulfur and said hydrocarbon.

8. A process as defined in claim 7 wherein said preloading takes place by passing sulfur vapor over said molecular sieve at an elevated temperature and depositing solid sulfur on said molecular sieve from said vapor.

9. A process as defined in claim 7 wherein said preloading takes place by filling the pores of said molecular sieve with $H_2S$ and oxidizing said $H_2S$ to sulfur in said pores.

10. In a process for the sulfurization of a hydrocarbon, the improvement comprising reacting said hydrocarbon with a quantity of sulfur which is stoichiometrically in excess of that necessary to dehydrogenate said hydrocarbon in the presence of a crystalline aluminosilicate zeolite molecular sieve catalyst.

11. A process as defined in claim 10 wherein said molecular sieve contains a metal cation selected from alkali metals, alkaline earth metals and the rare earths, said cation serving to neutralize the negative charge associated with a tetrahedral aluminum atom in the crystal lattice of said aluminosilicate.

12. A process as defined in claim 10 wherein said crystalline aluminosilicate has pore openings of at least approximately 5 A. in cross-section.

13. A process as defined in claim 10 wherein said crystalline aluminosilicate contains a cation which is capable of forming a complex with sulfur, said cation serving to neutralize the negative charge associated with a tetrahedral aluminum atom in the crystal lattice of said aluminosilicate.

14. A process as defined in claim 10 wherein said molecular sieve has been preloaded with sulfur prior to said reaction between the sulfur and said hydrocarbon.

15. A process as defined in claim 14 wherein said preloading takes place by passing sulfur vapor over said molecular sieve at an elevated temperature and depositing solid sulfur on said molecular sieve from said vapor.

16. A process as defined in claim 14 wherein said preloading takes place by filling the pores of said molecular sieve with $H_2S$ and oxidizing said $H_2S$ to sulfur in said pores.

17. In a process for the dehydrogenation of a hydrocarbon through the reaction of said hydrocarbon with sulfur, the improvement comprising carrying out said dehydrogenation reaction under dehydrogenation reaction conditions in the presence of a crystalline aluminosilicate molecular sieve catalyst containing a cation selected from alkali metals, alkaline earth metals, rare earth metals, ammonium, silver, zinc, nickel, cobalt and magnesium, said cation serving to neutralize the negative charge associated with a tetrahedral aluminum atom in the crystal lattice of said aluminosilicate, the quantity of sulfur relative to the quantity of hydrocarbon being stoichiometrically such as to result in dehydrogenation of the latter.

18. A process as defined in claim 17 wherein said reaction is a dehydrogenation reaction resulting in the production of a dehydrogenation product and $H_2S$ and wherein said process is a cyclic process involving the oxidation of the $H_2S$ back to sulfur to be used in said dehydrogenation reaction; both said oxidation and dehydrogenation reactions taking place in the presence of the same type of molecular sieve catalyst.

19. In a process for the sulfurization of a hydrocarbon through the reaction of said hydrocarbon with a quantity of sulfur which is stoichiometrically in excess of that necessary to dehydrogenate said hydrocarbon, the improvement comprising carrying out said sulfurization reaction under sulfurization reaction conditions in the presence of a crystalline aluminosilicate molecular sieve catalyst containing a cation selected from alkali metals, alkaline earth metals, rare earth metals, ammonium, silver, zinc, nickel, cobalt and magnesium, said cation serving to neutralize the negative charge associated with a tetrahedral aluminum atom in the crystal lattice of said aluminosilicate.

References Cited by the Examiner
UNITED STATES PATENTS

| | | | |
|---|---|---|---|
| 2,925,375 | 2/1960 | Fleck et al. | 260—676 |
| 2,971,903 | 2/1961 | Kimberlin et al. | 208—46 |
| 2,971,904 | 2/1961 | Gladrow et al. | 208—46 |
| 2,983,670 | 5/1961 | Seubold | 208—46 |
| 3,030,431 | 4/1962 | Mattox et al. | 260—676 |
| 3,051,646 | 8/1962 | Brooke | 208—250 |
| 3,063,934 | 11/1962 | Epperly et al. | 260—676 |
| 3,110,741 | 11/1963 | Patinkin et al. | 260—683.3 |
| 3,121,756 | 2/1964 | Barrer | 260—676 |

DELBERT E. GANTZ, *Primary Examiner.*

ALPHONSO D. SULLIVAN, PAUL M. COUGHLAN,
*Examiners.*

S. P. JONES, *Assistant Examiner.*

UNITED STATES PATENT OFFICE
CERTIFICATE OF CORRECTION

Patent No. 3,247,278　　　　　　　　　　　　　　　　April 19, 1966

William E. Garwood et al.

It is hereby certified that error appears in the above numbered patent requiring correction and that the said Letters Patent should read as corrected below.

Column 5, line 8, for "methyl ammonium" read -- methylammonium --; line 63, for "$SiO_2Al_2O_3$" read -- $SiO_2/Al_2O_3$ --; column 10, line 23, for "2 - carboxy - 2 - methylcyclohexaneacetic" read -- 2-carboxy-2-methylcyclohexaneacetic --; column 18, line 4, for "bare" read -- rare --; line 24, for "surfur" read -- sulfur --; column 20, lines 33 and 34, strike out the following:

Carbon, wt. percent ------ <0.05
   Sulfur, wt. percent ------ 15.3

Signed and sealed this 1st day of August 1967.

(SEAL)
Attest:

EDWARD M. FLETCHER, JR.　　　　　　　　　　　　EDWARD J. BRENNER
Attesting Officer　　　　　　　　　　　　　　　Commissioner of Patents